Dec. 13, 1938.  N. L. DILTS  2,140,418
PORTABLE WARDROBE
Filed Feb. 24, 1936  3 Sheets-Sheet 1
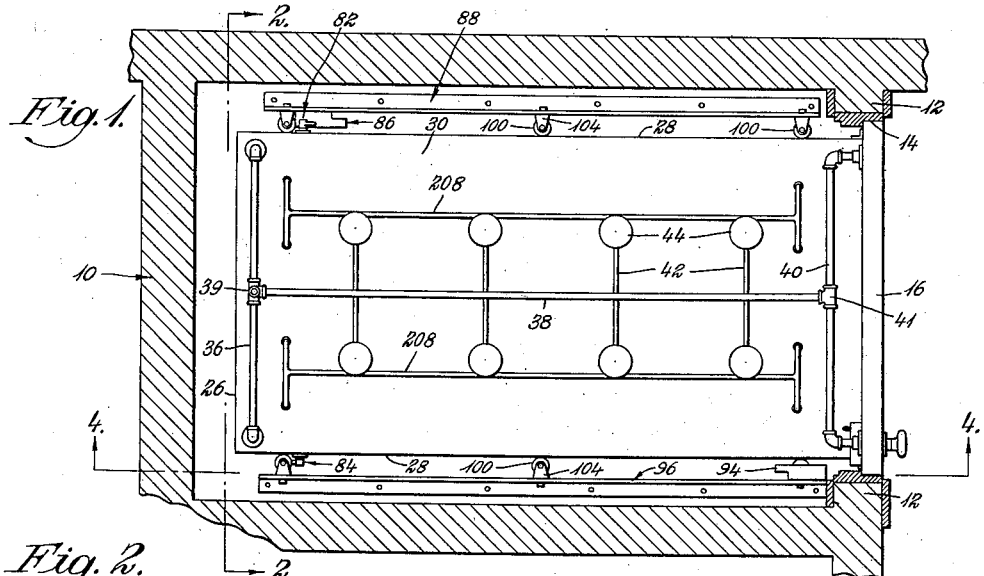
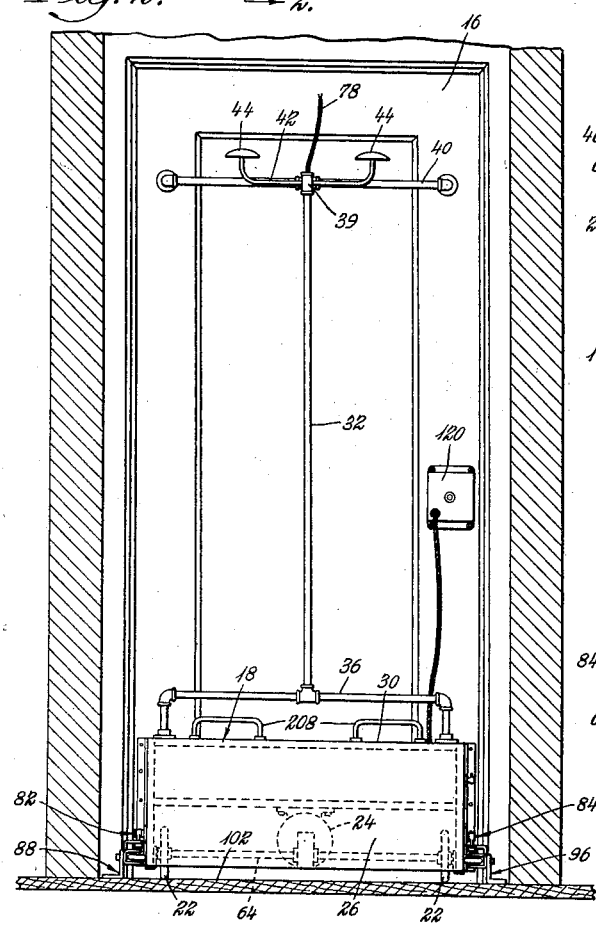
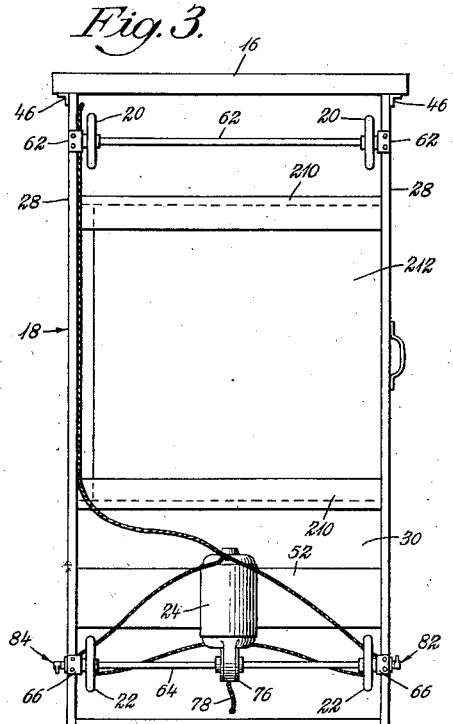
Noah L. Dilts.
INVENTOR
BY Victor J. Evans & Co.
HIS ATTORNEYS Dec. 13, 1938.   N. L. DILTS   2,140,418
PORTABLE WARDROBE
Filed Feb. 24, 1936   3 Sheets-Sheet 2

Noah L. Dilts.
INVENTOR
BY Victor J. Evans & Co.
HIS ATTORNEYS

Dec. 13, 1938.   N. L. DILTS   2,140,418
PORTABLE WARDROBE
Filed Feb. 24, 1936   3 Sheets-Sheet 3
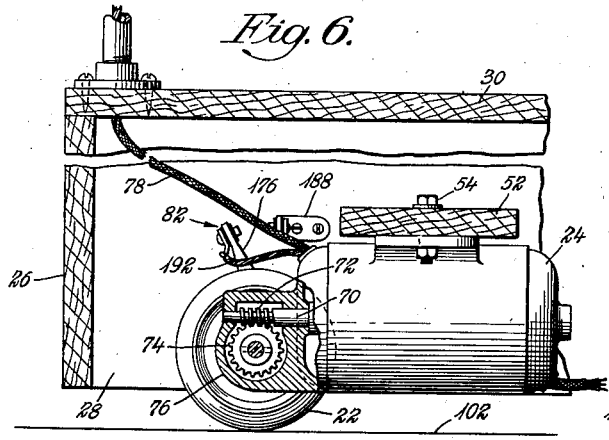
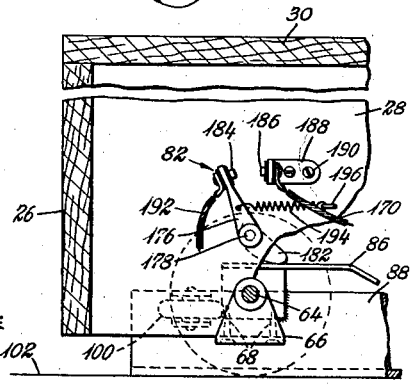
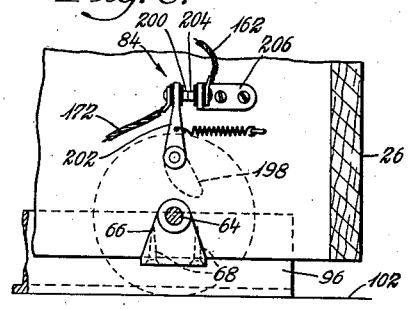
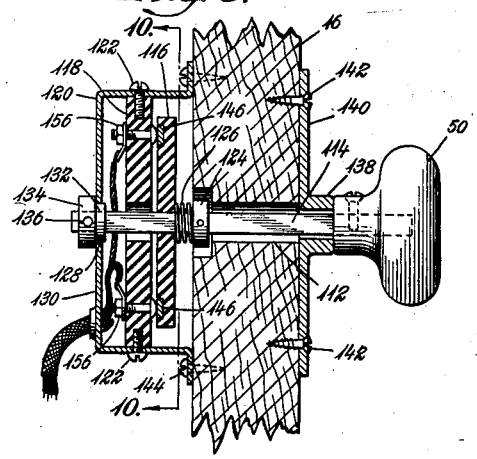
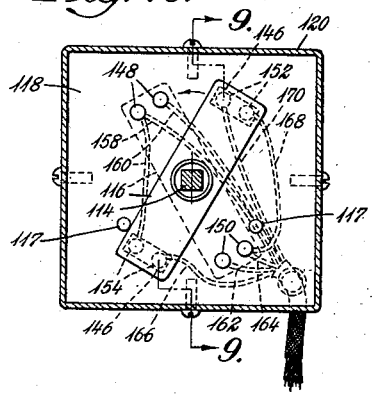
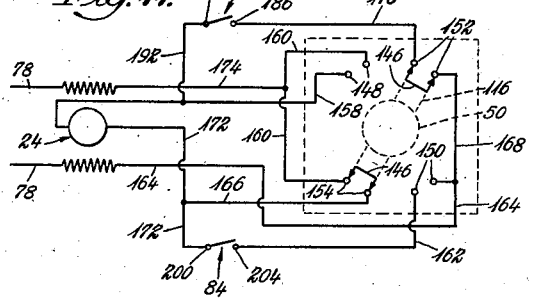
Noah L. Dilts.
INVENTOR
BY Victor J. Evans & Co.
HIS ATTORNEYS Patented Dec. 13, 1938

2,140,418

UNITED STATES PATENT OFFICE 2,140,418

PORTABLE WARDROBE

Noah L. Dilts, Hammond, Ind.

Application February 24, 1936, Serial No. 65,530

1 Claim. (Cl. 312—99.5)

My invention relates to the disposition of wearing apparel, and has among its objects and advantages the provision of an improved roll away closet.

In the accompanying drawings:

Fig. 1 is a top plan view of my invention positioned inside a closet with the closet illustrated in section for the sake of clearness;

Fig. 2 is a sectional view taken along the line 2—2 of Fig. 1 illustrating my invention in an upright position;

Fig. 3 is a bottom plan view of my device;

Fig. 6 is a sectional view taken along the line 6—6 of Fig. 5;

Fig. 7 is a sectional view taken along the line 7—7 of Fig. 5;

Fig. 8 is a sectional view taken along the line 8—8 of Fig. 5;

Fig. 9 is a sectional view taken along the line 9—9 of Fig. 10;

Fig. 10 is a sectional view along the line 10—10 of Fig. 9; and

Fig. 11 is an illustration of the electric circuit.

Figure 4:
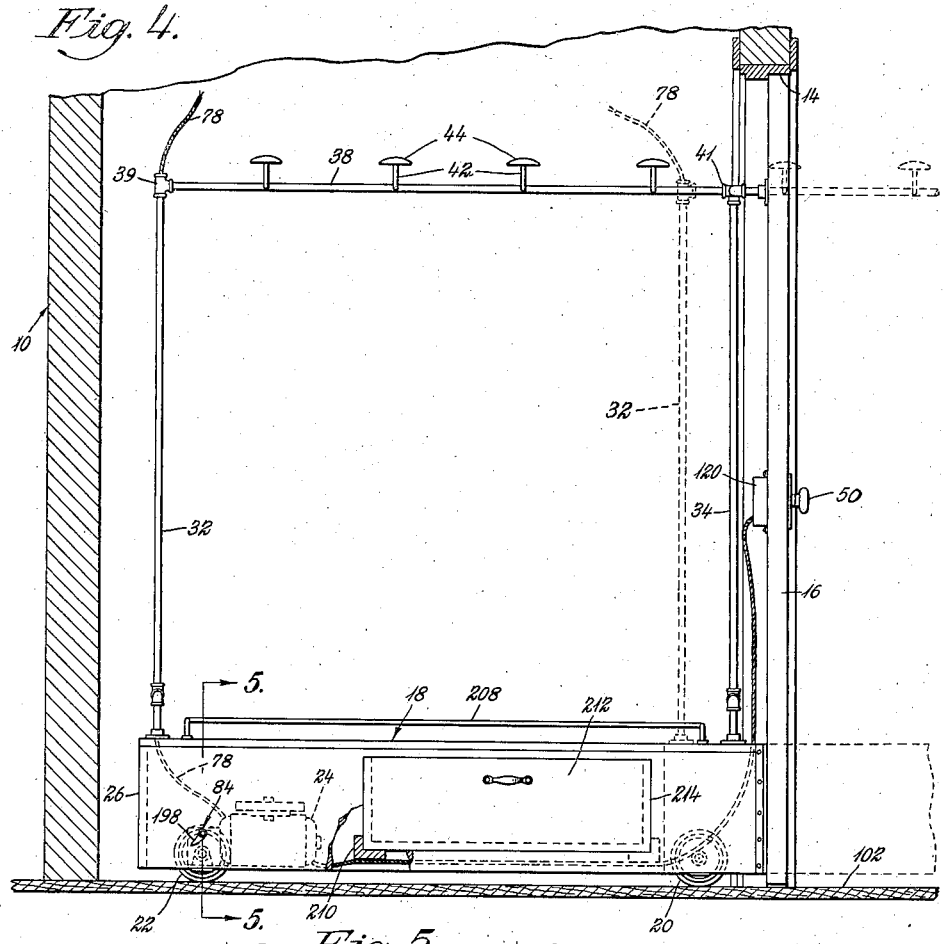
Fig. 4 is a sectional view taken substantially along the line 4—4 of Fig. 1.

In the embodiment selected to illustrate my invention, I make use of a closet 10 having its wall 12 provided with a door opening 14 arranged to be closed by a door 16. My invention includes a vehicle 18 provided with pairs of supporting wheels 20 and 22, the latter being operatively connected with a reversible motor 24. The vehicle 18 includes a box like structure comprising an end wall 26, side walls 28, and a top 30, upon which two upright supporting members 32 and 34 are mounted. The lower ends of the members 32 and 34 are each connected with a cross member 36, which in turn is fixedly mounted upon the top 30.

To the upper end of the member 32 I connect one end of a wearing apparel support 38 through the medium of a coupling element 39. The other end of the support 38 is connected with a cross member 40 by a coupling element 41, while both ends of the cross member 40 are fixedly connected with the door 16. All the parts 32, 34, 36, and 40 are of tubular construction for the purpose of securing sufficient strength in a structure of relatively light weight.

A plurality of laterally projecting bars 42 is secured to the member 38, which bars are bent upwardly and provided with caps 44 suitable for supporting hats. Clothes hangers may be attached to the member 38.

Figure 5:
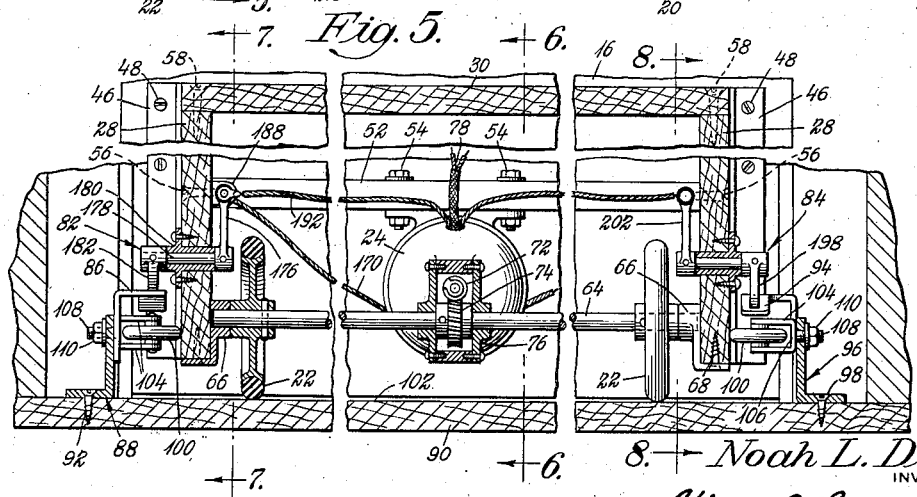
Fig. 5 is a sectional view taken substantially along the line 5—5 of Fig. 4.

In Figs. 2, 4, and 5, I illustrate the door 16 as being fixedly connected with the end wall 26 of the vehicle through the medium of angle irons 46. These angle irons are provided with openings for the reception of screws 48 imbedded in the material of the door 16 and the wall 26. Opening and closing of the door 16 is performed by the vehicle 18.

The door 16 is provided with a conventional knob 50 electrically connected with the motor 24 for starting the motor when the door 16 is to be opened or closed. In Figs. 5 and 6, the motor 24 is secured to a cross piece 52 by bolts 54, and the cross piece 52 may be secured to the walls 28 by screws 56. All the members of the box part of the vehicle may be screwed together as at 58.

The wheels 20 are mounted upon an axle 60 having its ends journaled in bearings 62 screwed to the side walls 28. The wheels 22 are fixedly connected with an axle 64 having its ends journaled in similar bearings 66. Referring to Figs. 5 and 7, the bearings 62 and 66 are shaped to bear against the inner sides of the walls 28 and across the lower edges for the reception of fastening screws 68. Upon the power shaft 70 of the motor 24, I mount a worm 72 arranged in mesh with a worm gear 74 fixedly connected with the axle 64. Both the worm and the worm gear may be enclosed within a housing 76 for protective purposes.

Wires 78 are associated with the motor 24 for connection with a source of current. These wires pass through the coupling element 39 between the cross member 38 and the member 32, and is housed within the member 32 and one of the cross members 36. In operation, the circuit through the motor is closed for opening the door 16 by turning the knob 50.

I provide means for breaking the circuit through the motor when the vehicle has traveled outwardly a predetermined distance. Similar means is provided for breaking the circuit through the motor after the vehicle has moved the door to its closed position. When the door is in its open position, the circuit through the motor is closed by rotating the knob in the opposite direction and the circuit through the motor is broken when the vehicle has returned the door to its full closed position.

Two limit switches 82 and 84 are mounted upon the walls 28 for breaking the motor circuit in either of the two positions of the vehicle. In Fig. 1, the limit switches 82 and 84 are illustrated as being positioned near the rear ends of the side walls 28. The limit switch 82 is actuated by engagement with a cam element 86 mounted upon an agle iron 88 secured to the floor 90 by means of screws 92. The limit switch 84 is arranged in the path of a cam member 94 secured to an angle iron 96 attached to the floor 90 by screws 98.

In addition to providing a mounting for the cam elements 86 and 94, the angle irons 88 and 96 provide mountings for guide wheels 100. These wheels are arranged in close relation with the side walls 28 and guide the vehicle in its travel to and fro upon the floor 102.

I mount three wheels 100 upon each side wall 28. In Fig. 5, I illustrate each wheel as being rotatably mounted between spaced flanges 104 cast integrally with a plate 106 bearing against its respective angle iron. The angle irons are provided with openings for the reception of threaded shafts 108 carried by the plates 106. The wheels are securely fastened to the angle irons by turning the nuts 110 down.

In Fig. 9, the door 16 is provided with openings 112 for the reception of a square shaft 114 fixedly connected with the knob 50. Upon the shaft 114 I mount a switch plate 116 of insulating material. This plate is provided with a square opening for receiving the shaft 114 and is urged in the direction of a wall 118 of insulating material and fixedly connected with a housing 120 by screws 122.

Between a collar 124 fixedly connected with the shaft 114 and the switch plate 116 I mount a spring 126 for urging the switch plate in the direction of the wall 118. An opening 128 is provided in the wall 130 of the housing for the reception of a circular collar 132 integrally connected with a collar 134 fixedly connected with the shaft 114 by a crew 136.

The collar 132 is rotatably positioned within the opening and the collar 134 prevents axial movement of the shaft 114 in one direction. A boss 138 carried by a plate 140 engages the neck of the knob 50 to prevent axial movement of the shaft in the opposite direction. Screws 142 fasten the plate to the door 16, while screws 144 fasten the housing 20 to the door.

While the switch plate 116 may move axially of the shaft 114, the switch plate is restrained from relative movement about the shaft and is rotated therewith when the knob 50 is turned. Abutments 117 limit the rotary movement of the switch plate. One side of the switch plate 116 is recessed for the reception of contact strips 146. For groups of contact elements 148, 150, 152, and 154 are mounted on the wall 118. These groups are positioned so as to establish electrical contact with the contact strips 146 through the rotation of the knob 50. Rotation of the knob in one direction brings the groups 152 and 154 into electrical connection with the strips 146, while rotation of the knob in the opposite direction establishes conducting relation between the groups 148 and 150 and the contact strips 146.

In Fig. 9, the contact elements 148, 150, 152, and 154 are in the nature of small bolts passing through the wall 118 for the reception of nuts 156, with the heads of the bolts contacting the strips 146. Referring to Figs. 10 and 11, wires 158 and 160 are electrically connected with the contact elements 148, while wires 162 and 164 are electrically connected with the contact elements 150.

In Fig. 11, the wire 160 is connected with one of the contact elements 154, while the other contact element 154 is electrically connected with a wire 166. One of the contact elements 152 is electrically connected with the wire 164 through the medium of a wire 168, while the other contact element 152 is electrically connected with a wire 170. I connect the wire 162 with the limit switch 84, while the wire 170 is connected with the limit switch 82. The wire 158 is electrically connected with the motor 24, while the wire 166 is connected with a wire 172 electrically connecting the limit switch 84 with the motor 24. The wire 160 is electrically connected with the field of the motor by a wire 174, while the wire 164 is electrically connected with the motor field.

In Fig. 7, the limit switch 82 comprises a switch arm 176 having an opening for the reception of a shaft 178 (see Fig. 5) rotatably mounted in a bearing 180 extending through its associated wall 28. The arm 176 is fixedly connected with one end of the shaft 178, while an actuating arm 182 is fixedly connected with the opposite end of the shaft. The actuating arm 182 is arranged in the path of the cam element 86 (see Fig. 7).

When the vehicle is positioned wholly within the closet, the switch arm 176 is cammed to the position of Fig. 7. At this time, the contact point 184 is held out of electrical contact with a companion point 186 carried by a bracket 188 fastened to its associated wall 28 by screws 190.

I connect the contact point 184 with a wire 192 electrically connected with the wire 158 (see Fig. 11). The contact point 186 is electrically connected with the wire 170. In Fig. 7, the arm 176 is connected with one end of a spring 194 having its opposite end fixedly connected at 196 with the wall 28. This spring urges the contacting arm 176 in the direction of the point 186 so that the two points 184 and 186 are pressed together whenever the vehicle is moved sufficiently far to bring the actuating arm 182 out of camming relation with the cam element 86.

Fig. 8 illustrates part of the limit switch 84. The two switches are identical in construction with the exception that the actuating arm 198 projects in a different direction for climbing the cam member 94 when the vehicle 18 reaches the limit of its outward travel. The contact point 200 carried by the switch arm 202 is electrically connected with the wire 172, while the contact point 204 carried by the bracket 206 is electrically connected with the wire 162.

With the vehicle positioned according to Fig. 4, the limit switch 82 is inoperative because of the adjustment of the switch arm 176 (see Fig. 7). At this time, the switch arm 202 of the limit switch 84 is positioned according to Fig. 8. Assuming that the vehicle 18 is positioned exteriorly of the closet and the door 16 is to be closed, the knob 50 is rotated clockwise to bring the strips 146 into electrical connection with the contact elements 152 and 154.

Referring to Figs. 10 and 11, with the switch plate 116 in the position of Fig. 10, the circuit is completed as follows: Lower wire 78, wires 164, and 168, contact elements 152 and their associated strip 146, wire 170, limit switch 82, wires 192 and 158, motor 24, wires 172 and 166, contact elements 154 and their associated strip 146, wires 160 and 174, and upper wire 78. With the circuit completed, the motor 24 moves the vehicle 18 to the position of Fig. 4, at which time the limit switch 82 is opened and the circuit broken.

To move the vehicle outwardly, the knob 54 is rotated in a counterclockwise direction, at which time the circuit is completed as follows: Lower wire 78, wire 164, contact elements 150 and their associated strip 146, wire 162, limit switch 84, wire 172, motor 24, wire 158, contact elements 148 and their associated strip 146, wires 160 and 174, and upper wire 78. When the circuit is closed in this maner, the vehicle 18 travels outwardly until the limit switch 84 is opened through engagement with the cam member 94.

My invention may be incorporated with closets of conventional design. When the vehicle 18 is moved exteriorly of the closet, the supporting structure for the wearing apparel is readily accessible. The vehicle is effectively guided in both directions so that the door 16 is moved completely closed. The switch mechanism associated with the knob 50 provides convenient facilities for operating the mechanism.

Upon the top 30 I mount a pair of bars 208 which are arranged in spaced relation with the top 30 for supporting articles such as shoes. In Figs. 3 and 4, I illustrate two L-shaped members 210 as having their ends abutting the side walls 28 and secured thereto for supporting a drawer 212. One of the walls 28 may be provided with an opening 214 for the reception of the drawer.

Without further elaboration, the foregoing will so fully explain my invention that others may, by applying current knowledge, readily adapt the same for use under various conditions of service.

I claim:

In a closet having an opening and a conventional door for closing the opening, a vehicle connected with the door for moving the same into closing and opening relation with said opening, an electric motor carried by said vehicle and operatively connected therewith for propelling the same, said door being provided with a rotatable knob, a switch operatively connected with the door knob and said motor, and a garment support anchored to the vehicle and the door, said garment support being positioned inside the closet with the door in its closed position.

NOAH L. DILTS.